Patented Feb. 4, 1936

2,029,807

UNITED STATES PATENT OFFICE 2,029,807

METHOD OF HEAT TREATING WELDED CONTAINERS

Harry S. Blumberg, New York, N. Y., assignor to M. W. Kellogg Company, New York, N. Y., a corporation of Delaware No Drawing. Application January 9, 1934, Serial No. 705,979

3 Claims. (Cl. 148—21.5)

This invention relates in general to the fabrication, by means of electric arc welding, of containers such as are used in the cracking and refining of hydrocarbon oils, and more particularly to a method for heat treating such containers after the arc welding operation.

The hydrocarbon oil stocks available for cracking ordinarily contain a sufficient amount of sulphur to render them highly corrosive at the elevated temperatures and pressures to which they are subjected during cracking. For this reason it is highly desirable that the containers used in the cracking of hydrocarbon oils have superior corrosion resisting properties. Although chromium alloy steels of superior corrosion resisting properties have been available in commercial quantities for a number of years, carbon steel is still the material generally employed in the fabrication of the containers of the character mentioned. This is due to the fact that some of the chromium alloy steels are too high priced whereas others although not a great deal more expensive than carbon steel have properties and characteristics which render the fabrication of an acceptable container a difficult problem.

Of the many chromium alloy steels now on the market the chromium alloy steel containing from 4%–6% of chromium very satisfactorily fills the requirements for containers of the character mentioned as it is only three to five times as expensive as the carbon steel previously used and yet it is from five to ten times as corrosion resistant. Acceptable arc welded containers have not generally been produced from this material. Initially it was proposed to use arc welding electrodes of chromium steel containing from 4%–6% of chromium so as to have the weld metal and base metal of the same material and thereby simplify the heat treatment of the completed container. This proposal was soon discarded as welding electrodes made of chromium steel containing from 4%–6% of chromium either produce welds which though sufficiently dense developed serious cracks upon cooling, or produce porous welds which developed serious cracks upon cooling.

It was then proposed to use welding electrodes made of low carbon chromium nickel steel generally containing, exclusive of iron and impurities, 18% chromium, 8% nickel and a maximum of 0.07% carbon as with welding electrodes of this material the welds are dense and do not crack upon cooling. This proposal was not entirely satisfactory as it was not possible to heat treat completed containers so as to have both the base metal and the weld metal in the best state for resistance to conditions of service. The best heat treatment for chromium steel containing 4%–6% chromium base metal includes heating to the vicinity of 1600° F., holding this temperature for a sufficient length of time to assure thorough heat penetration, and then cooling at a very slow rate. The best heat treatment for the low carbon chromium nickel steel weld metal includes heating to a temperature between 1800° F. and 2100° F., holding this temperature for a sufficient length of time to assure solution of carbides and then cooling at a very rapid rate, preferably quenching. The heat treatment, just mentioned, for the chromium steel containing 4%–6% chromium, provides optimum conditions for the precipitation of chromium carbide in the low carbon chromium nickel steel weld metal and consequently such heat treatment would leave the low carbon chromium nickel steel weld metal in a condition in which it would be most susceptible to corrosion. The best heat treatment, above mentioned, for the low carbon chromium nickel steel weld metal would leave the 4%–6% chromium steel base metal very hard and brittle and with very low impact resistance.

It has recently been proposed to make the welding electrodes out of low carbon chromium nickel titanium steel that generally includes, exclusive of iron and impurities, 18% chromium, 8% nickel, a maximum of 0.07% carbon, and a minimum of 0.42% titanium. This steel is similar to low carbon 18% chromium, 8% nickel steel except that it contains an amount of titanium sufficient to form titanium carbide with substantially all of the carbon present. As is well known carbon is selective in its carbide forming properties, so that upon cooling, the carbon in the low carbon chromium nickel titanium steel will combine with the titanium to form titanium carbide and the chromium will not be precipitated out. Thus this steel by heat treatment can be brought to a state in which it is not susceptible to intergranular corrosion. However no heat treatment has as yet been devised by means of which both the 4%–6% chromium steel base metal and the low carbon chromium nickel titanium steel weld metal can be brought to the desired state.

It is an object of this invention to provide a method for heat treating containers of the character mentioned whose base metal and weld metal are of different composition whereby the base metal and weld metal are brought to the best state for resistance to the conditions of service.

It is also an object of this invention to provide a method for heat treating welded containers whose base metal and weld metal have different chemical and metallurgical characteristics that includes a single heat treatment which brings out highly satisfactory characteristics of both base metal and weld metal.

In accordance with my invention the base metal, which is preferably of chrome steel containing from 4%–6% chromium or similar material, required to form the desired container, is cut and worked upon in the usual manner to form it into the component parts of the desired container. After this is done the component parts of the desired container are assembled and prepared for electric arc welding, as in the usual practice. The component parts are then united by electric arc welding. Preferably the weld metal is supplied by a welding electrode which in the ordinary case should include a protective covering of the usual character. At present I prefer to employ a covered welding electrode whose metallic core is made of low carbon chromium nickel titanium steel generally containing, exclusive of iron, and impurities, 18% chromium, 8% nickel, a maximum of 0.07% carbon and a minimum of 0.42% titanium. However, elements such as columbium or tantalum may be substituted in the welding electrode core in place of the titanium in sufficient amounts to combine with all of the carbon. Also, if desired, the metallic core of the welding electrode may include only some of the constituents of the desired weld metal, the remainder of the constituents may be incorporated into the protective covering of the welding electrode or may be placed in the welding groove. As an example, the metallic core of the welding electrode may be low carbon chromium nickel steel generally containing, exclusive of iron and impurities, 18% chromium, 8% nickel and a maximum of 0.07% carbon and the necessary titanium required to produce weld metal of the desired composition incorporated in the protective covering of the welding electrode. The completed container is then heat treated to bring both the base metal and the weld metal to the state for resistance to conditions of service.

In carrying out the heat treatment in accordance with one preferred embodiment of my invention, the container after it is welded is put into a furnace, which may be of any suitable construction, and therein heated to a temperature above the critical range of the base metal. The temperature to which the container is heated should be high enough to assure complete recrystallization of the base metal and solution of the carbides to take place in the weld metal. With 4%–6% chromium steel as the base metal and low carbon chromium nickel titanium steel of the composition above indicated as the weld metal, 1625° F. is a suitable temperature although it must be understood that the temperature may be somewhat above or below this temperature.

After the container has been heated to the temperature just mentioned the heat input to the furnace is so controlled that the temperature of the container diminishes at a controlled constant rate until the base metal is annealed and the carbides in the weld metal precipitate out in harmless form. With the base metal and weld metal above mentioned cooling at the rate of 25° F. per hour or less until the container attains a temperature below the critical range of the base metal, 1,000° F. is at present preferred, has been found entirely satisfactory. After the container has cooled to 1,000° F. it may be removed from the furnace and allowed to cool at an uncontrolled rate to ordinary temperature, or if desired, the container may be left in the furnace to cool with the furnace to ordinary temperature.

In carrying out the heat treatment in accordance with another preferred embodiment of my invention the completed container is placed in a suitable furnace and therein heated to a temperature above the upper critical range of the base metal. The temperature chosen should be such as to assure recrystallization taking place in the base metal and solution of the carbides taking place in the weld metal. 1625° F. is a suitable temperature for this purpose when the base metal is 4%–6% chromium steel, or chromium or other alloy steel of similar metallurgical characteristics, and the weld metal is low carbon chromium nickel titanium steel with the composition indicated or similar alloy. The container is maintained at this temperature for a sufficient length of time to allow the changes in the base metal and in the weld metal to proceed to practical completion. With containers of the usual thickness three hours has been found to be sufficient length of time.

The heat input to the furnace is then controlled to obtain a constant slow cooling of the container to below the critical range of the base metal. The purpose of this slow cooling is to promote the formation of a fully annealed base metal and to precipitate the carbides in a harmless form in the weld metal. With base metal and weld metal of the character mentioned cooling at the rate of 125° F. per hour or less to 1,000° F. is satisfactory although these values may be varied to some extent without materially varying the result obtained. The heat input to the furnace is then again increased to raise the temperature of the container to a temperature close to but yet below the critical range of the base metal. A temperature of 1270° F. is the temperature preferred with the base and weld metal of the character mentioned. This temperature is then maintained for a sufficient length of time to allow the base metal to approach final equilibrium. Three hours is sufficient length of time with containers of the usual thickness.

At the end of the three hour period the heat input to the furnace is again controlled to obtain a slow cooling of the container. Again cooling at the rate of 125° F. or less per hour is preferred but satisfactory results are obtained by ordinary uncontrolled slow cooling. The cooling is allowed to proceed at the rate mentioned until the container reaches a temperature of about 1,000° F. From that temperature the container is allowed to cool to ordinary temperature either within the furnace or in the outside air.

Either heat treatment produces a fully annealed container whose weld metal and base metal are both in a state in which they exhibit not only acceptable but superior corrosion resisting properties.

While I have hereinabove set forth and described my invention with reference to specific examples, it will be understood that my invention is not limited to such specific examples but may be variously practiced and embodied within the scope of the claims hereinafter made.

I claim:
1. The method of heat treating an electric arc welded chrome alloy steel container whose base metal is a chromium steel containing from 4% to 6% of chromium and the remainder exclusive of carbon and impurities of iron and whose weld metal is an austenitic chromium-nickel-iron al- loy of low carbon content that includes as a constituent thereof an element taken from the group of titanium, columbium and tantalum of greater carbide forming tendency than chromium in such an amount as to combine with substantially all of the carbon in the weld metal which comprises heating the container to a temperature at which recrystallization takes place in the base metal and solution of carbides takes place in the weld metal, holding the container at this temperature for a sufficient length of time to allow the changes in the base metal to proceed to practical completion, slowly cooling the container to a temperature below the critical range of the base metal at a controlled rate to promote the attainment of the fully annealed condition by the base metal and to precipitate the carbides in a harmless state in the weld metal, reheating the container to a temperature below the critical range of the base metal but substantially approaching the critical range of the base metal, holding the container at the temperature to which it is reheated for a length of time to enable the base metal to approach final equilibrium state, and cooling the container to ordinary temperature.

2. The method of heat treating an electric arc welded chrome alloy steel container whose base metal is a chromium steel containing from 4% to 6% of chromium and the remainder exclusive of carbon and impurities iron and whose weld metal is an austenitic chromium-nickel-iron alloy of low carbon content that includes as a constituent thereof an element taken from the group of titanium, columbium and tantalum of greater carbide forming tendency than chromium in such an amount as to combine with substantially all of the carbon in the weld metal which comprises heating the container to a temperature at which recrystallization takes place in the base metal and solution of carbides takes place in the weld metal, holding the container at this temperature for a sufficient length of time to allow the changes in the base metal and in the weld metal to proceed to practical completion, slowly cooling the container to a temperature below the critical range of the base metal at a controlled rate to promote the attainment of the fully annealed condition by the base metal and to precipitate the carbides in a harmless state in the weld metal, reheating the container to a temperature below the critical range of the base metal but substantially approaching the critical range of the base metal, holding the container at the temperature to which it is reheated for a length of time to enable the base metal to approach final equilibrium state, slowly cooling the container to a temperature approximating said first mentioned temperature below the critical range of the base metal at a controlled rate to further promote the attainment of final equilibrium state by the weld metal and cooling to ordinary temperature at an uncontrolled rate.

3. The method of heat treating an electric arc welded chrome alloy steel container whose base metal is a chromium steel containing from 4% to 6% of chromium and the remainder exclusive of carbon and impurities iron and whose weld metal is an austenitic chromium-nickel-iron alloy of low carbon content that includes as a constituent thereof an element taken from the group of titanium, columbium and tantalum of greater carbide forming tendency than chromium in such an amount as to combine with substantially all of the carbon in the weld metal which comprises heating the container to 1625° F., maintaining the container at this temperature for three hours, cooling the container to 1000° F. at the rate of 125° F. per hour, reheating the container to 1270° F., maintaining the container at the latter temperature for three hours, cooling the container to 1000° F. at a rate of 125° F. per hour, and cooling the container to ordinary temperature at an uncontrolled rate.

HARRY S. BLUMBERG.